US012570090B2

(12) United States Patent

Uchida

(10) Patent No.: US 12,570,090 B2

(45) Date of Patent: *Mar. 10, 2026

(54) INK JET RECORDING APPARATUS AND RECORDING METHOD USING INK ACCOMMODATING CONTAINERS HAVING THE SAME HEIGHT AT AN INK POURING PORT

(71) Applicant: SEIKO EPSON CORPORATION, Tokyo (JP)

(72) Inventor: Kenta Uchida, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 125 days.

This patent is subject to a terminal disclaimer.

(21) Appl. No.: 18/619,375

(22) Filed: Mar. 28, 2024

(65) Prior Publication Data

US 2024/0326451 A1 Oct. 3, 2024

(30) Foreign Application Priority Data

Mar. 29, 2023 (JP) ................................. 2023-053341

(51) Int. Cl.
| | |
|---|---|
| *B41J 2/175* | (2006.01) |
| *B41J 2/21* | (2006.01) |
| *C09D 11/322* | (2014.01) |
| *C09D 11/40* | (2014.01) |

(52) U.S. Cl.
CPC ........... *B41J 2/175* (2013.01); *B41J 2/17509* (2013.01); *B41J 2/17513* (2013.01); *B41J 2/2103* (2013.01); *C09D 11/322* (2013.01); *C09D 11/40* (2013.01)

(58) Field of Classification Search
CPC ...... B41J 2/175; B41J 2/2103; B41J 2/17509; B41J 2/17513; C09D 11/322; C09D 11/40
See application file for complete search history.

(56) References Cited

U.S. PATENT DOCUMENTS

| | | |
|---|---|---|
| 4,957,553 A | 9/1990 | Koike et al. |
| 2015/0049144 A1 | 2/2015 | Aoki et al. |
| 2015/0049146 A1 | 2/2015 | Nakano et al. |
| 2015/0049147 A1 | 2/2015 | Nakano et al. |

(Continued)

FOREIGN PATENT DOCUMENTS

JP 2015-061896 A 4/2015

*Primary Examiner* — Henok D Legesse

(74) *Attorney, Agent, or Firm* — Harness, Dickey & Pierce, P.L.C.

(57) ABSTRACT

An ink jet recording apparatus includes: an ink accommodating container having an ink pouring port; an ink composition; and an ink jet head that discharges the ink composition supplied from the ink accommodating container, in which the ink accommodating container includes a first ink accommodating container and a second ink accommodating container having a lower height from a bottom of the accommodating container to the ink pouring port than the first ink accommodating container, the ink composition includes a first ink composition accommodated in the first ink accommodating container and a second ink composition accommodated in the second ink accommodating container, and the first ink composition has a lower foaming property than the second ink composition.

9 Claims, 5 Drawing Sheets

(56) References Cited

U.S. PATENT DOCUMENTS

| | | | |
|---|---|---|---|
| 2020/0171833 A1* | 6/2020 | Iinuma | .................... B41J 29/02 |
| 2020/0198358 A1* | 6/2020 | Uchida | ................ B41J 2/17506 |
| 2023/0079381 A1 | 3/2023 | Hirai et al. | |
| 2024/0326452 A1* | 10/2024 | Uchida | ................ B41J 2/17513 |

* cited by examiner

FIG. 2

| | | INK 1 | INK 2 | INK 3 | INK 4 | INK 5 | INK 6 | INK 7 | INK 8 | INK 9 | INK 10 |
|---|---|---|---|---|---|---|---|---|---|---|---|
| SELF-DISPERSION PIGMENT | BLACK PIGMENT CAB-O-JET 400 | 6 | 6 | – | – | – | – | – | – | – | – |
| | CYAN PIGMENT CAB-O-JET 450C | – | – | 6 | 6 | 6 | 6 | – | – | – | 6 |
| | MAGENTA PIGMENT CAB-O-JET 465M | – | – | – | – | – | – | – | – | – | – |
| | YELLOW PIGMENT CAB-O-JET 470Y | – | – | – | – | – | – | – | – | – | – |
| RESIN DISPERSION PIGMENT | CYAN PIGMENT | – | – | – | – | – | – | 6 | 6 | – | – |
| | DISPERSANT RESIN | – | – | – | – | – | – | 2 | 2 | – | – |
| DYE | CYAN DYE | – | – | – | – | – | – | – | – | 6 | – |
| ORGANIC SOLVENT | GLYCERIN | 5 | 5 | 5 | 5 | 5 | 5 | 5 | 5 | 5 | 5 |
| | TRIETHYLENE GLYCOL | 5 | 5 | 5 | 5 | 5 | 5 | 5 | 5 | 5 | 5 |
| | TRIETHYLENE GLYCOL MONOBUTYL ETHER | 1 | 1 | 1 | 1 | 1 | 1 | 1 | 1 | 1 | 1 |
| | TRIETHYLENE GLYCOL MONOMETHYL ETHER | 1 | 1 | 1 | 1 | 1 | 1 | 1 | 1 | 1 | 1 |
| | 2-PYRROLIDONE | 4 | 4 | 4 | 4 | 4 | 4 | 4 | 4 | 4 | 4 |
| | 1,2-HEXANEDIOL | 3 | 3 | 3 | 3 | 3 | 3 | 3 | 3 | 3 | 3 |
| RESIN | X-436 | – | 0.2 | – | 0.2 | 2.0 | 2.0 | – | 0.2 | – | 5.0 |
| SURFACTANT | OLFINE E1010 | 0.5 | 0.5 | 0.5 | 0.5 | 0.5 | 0.5 | 0.5 | 0.5 | 0.5 | 0.5 |
| | OLFINE EXP4300 | 0.1 | 0.1 | 0.1 | 0.1 | 0.1 | 0.1 | 0.1 | 0.1 | 0.1 | 0.1 |
| pH ADJUSTING AGENT | TRIETHANOLAMINE | 0.5 | 0.5 | 0.5 | 0.5 | 0.5 | 0.5 | 0.5 | 0.5 | 0.5 | 0.5 |
| DEFOAMING AGENT | SN WET 980 | – | – | – | – | – | 0.05 | – | – | – | – |
| | PURE WATER | RESIDUE | RESIDUE | RESIDUE | RESIDUE | RESIDUE | RESIDUE | RESIDUE | RESIDUE | RESIDUE | RESIDUE |
| | DEFOAMING PROPERTY | a | b | a | b | c | a | b | c | a | c |
| | SCRATCH RESISTANCE | c | b | c | b | a | a | a | a | a | a |

FIG. 3

| | | EXAMPLE 1 | | EXAMPLE 2 | EXAMPLE 3 | | EXAMPLE 4 | | EXAMPLE 5 | | EXAMPLE 6 | |
|---|---|---|---|---|---|---|---|---|---|---|---|---|
| ACCOMMODATING CONTAINER | | 1 | 2 | 1 | 1 | 2 | 1 | 2 | 1 | 2 | 1 | 2 |
| INK | | INK 1 | INK 4 | INK 3 | INK 2 | INK 1 | INK 5 | INK 6 | INK 2 | INK 1 | INK 7 | INK 1 | INK 8 |
| HEIGHT FROM TANK BOTTOM TO POURING PORT [mm] | | 200 | 100 | 200 | 100 | 200 | 100 | 200 | 100 | 200 | 100 | 200 | 100 |
| FOAM HEIGHT | | A | A | A | A | A | B | A | A | A | A | A | B |
| DETERMINATION | | A | | A | | B | | A | | A | | B | |

FIG. 4

| | EXAMPLE 7 | | EXAMPLE 8 | | EXAMPLE 9 | | EXAMPLE 10 | | COMPARATIVE EXAMPLE 1 | | COMPARATIVE EXAMPLE 2 | |
|---|---|---|---|---|---|---|---|---|---|---|---|---|
| ACCOMMODATING CONTAINER | 1 | 2 | 1 | 2 | 1 | 2 | 1 | 2 | 2 | 1 | 2 | 1 |
| INK | INK 9 | INK 2 | INK 1 | INK 4 | INK 1 | INK 4 | INK 1 | INK 10 | INK 1 | INK 5 | INK 1 | INK 4 |
| HEIGHT FROM TANK BOTTOM TO POURING PORT [mm] | 200 | 100 | 400 | 100 | 100 | 70 | 200 | 100 | 100 | 200 | 100 | 300 |
| FOAM HEIGHT | A | A | B | A | A | A | A | B | A | C | A | C |
| DETERMINATION | A | | B | | A | | B | | C | | C | |

INK JET RECORDING APPARATUS AND RECORDING METHOD USING INK ACCOMMODATING CONTAINERS HAVING THE SAME HEIGHT AT AN INK POURING PORT

The present application is based on, and claims priority from JP Application Serial Number 2023-053341, filed Mar. 29, 2023, the disclosure of which is hereby incorporated by reference herein in its entirety.

BACKGROUND

1. Technical Field

The present disclosure relates to an ink jet recording apparatus and a recording method.

2. Related Art

There is known an ink jet recording apparatus that records an image or the like on a recording medium by minute ink droplets discharged from a nozzle of a recording head for ink jet recording.

In addition, remote work and SOHO are increasing, and an opportunity to use the ink jet recording apparatus at home or the like is also increasing.

The ink jet recording apparatus has an ink container (for example, an ink cartridge) for supplying an ink composition to the recording head.

As such an ink container, for example, a type in which the ink container itself is replaced (so-called ink cartridge) when an amount of the ink composition in the ink container is equal to or less than a certain amount, and a type in which a continuous supply type ink container is replenished with the ink composition without replacing the ink container (so-called continuous supply type ink container) are known.

For example, JP-A-2015-061896 discloses an ink composition that is poured into an ink container which has an ink chamber configured to be replenished with the ink composition and an ink pouring port configured to be opened and closed and in which the ink chamber is configured to communicate with outside air, the ink composition containing a pigment, a resin, and an organic solvent, in which a static contact angle between the ink composition and a member constituting an inner side of a wall partitioning the ink chamber is 10° or more.

Examples of an ink accommodating container include the above-mentioned continuous supply type ink container (also referred to as a CISS tank in the present specification). The CISS tank has an advantage in that continuous printing can be performed without a need to replace the ink cartridge. In addition, it is not necessary to replace the ink cartridge every time, and the ink accommodating container need only be replenished with an ink.

On the other hand, when air bubbles are generated and reach a pouring port during ink pouring into the CISS tank, the air bubbles may overflow from the ink accommodating container.

It is required to suppress the overflowing of the ink composition from the ink accommodating container due to foaming of the ink composition.

The present inventors made intensive studies to solve the above problem. As a result, the present inventors found that the above-described problem can be solved by using an ink jet recording apparatus including a predetermined configuration, and completed the present disclosure.

SUMMARY

The present disclosure is as follows.

According to an aspect of the present disclosure, there is provided an ink jet recording apparatus including: an ink accommodating container having an ink pouring port; an ink composition; and an ink jet head that discharges the ink composition supplied from the ink accommodating container, in which the ink accommodating container includes a first ink accommodating container and a second ink accommodating container having a lower height from a bottom of the accommodating container to the ink pouring port than the first ink accommodating container, the ink composition includes a first ink composition accommodated in the first ink accommodating container and a second ink composition accommodated in the second ink accommodating container, and the first ink composition has a lower foaming property than the second ink composition.

According to another aspect of the present disclosure, there is provided a recording method using the ink jet recording apparatus according to the present disclosure, the method including: supplying the first ink composition accommodated in the first ink accommodating container and the second ink composition accommodated in the second ink accommodating container to the ink jet head; and discharging the first ink composition and the second ink composition from the ink jet head and adhering the first ink composition and the second ink composition to a recording medium.

BRIEF DESCRIPTION OF THE DRAWINGS

FIG. 2 is a table illustrating a result of Example.

FIG. 3 is a table illustrating a result of Example.

FIG. 4 is a table illustrating a result of Example.

DESCRIPTION OF EMBODIMENTS

Figure 1:
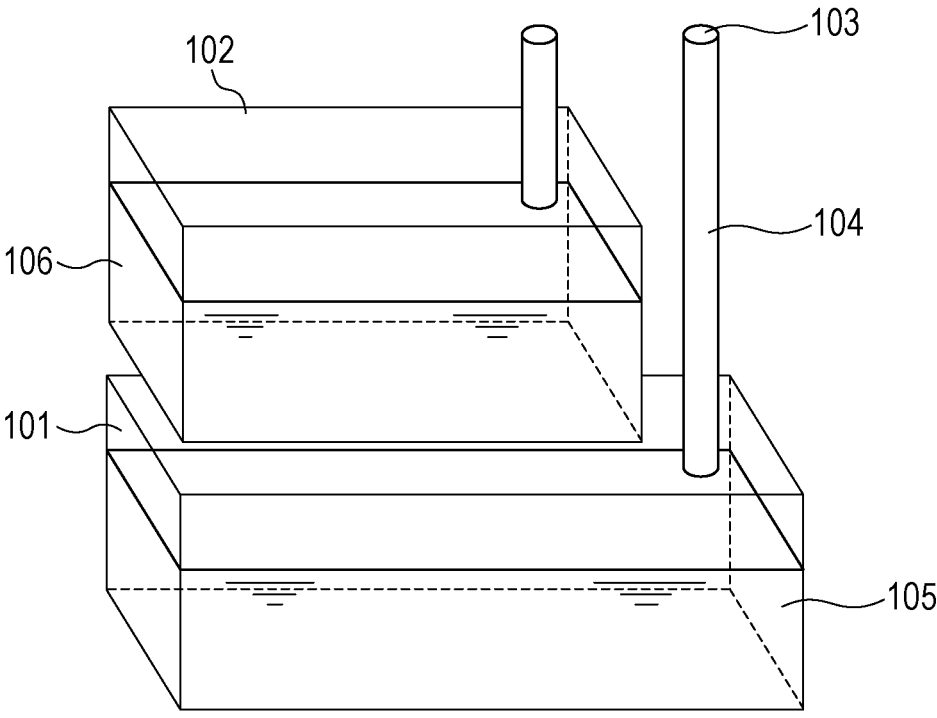
FIG. 1 is a schematic diagram illustrating an embodiment of an ink accommodating container.

Hereinafter, an embodiment of the present disclosure (hereinafter, referred to as "the present embodiment") will be described in detail, but the present disclosure is not limited to this, and various modifications can be made without departing from the scope of the present disclosure.

1. Ink Jet Recording Apparatus

An ink jet recording apparatus of the present embodiment includes: an ink accommodating container having an ink pouring port; an ink composition; and an ink jet head that discharges the ink composition supplied from the ink accommodating container, in which the ink accommodating container includes a first ink accommodating container and a second ink accommodating container having a lower height from a bottom of the accommodating container to the ink pouring port than the first ink accommodating container, the ink composition includes a first ink composition accommodated in the first ink accommodating container and a second ink composition accommodated in the second ink accommodating container, and the first ink composition has a lower foaming property than the second ink composition.

The ink composition has a different foaming property depending on a composition. For example, resin particles (emulsifier dispersion type) and resin dispersion pigments are dispersants (emulsifiers) and thus tend to cause foaming. Dispersants that disperse pigments also tend to cause foaming.

In addition, since a tank having a long height from the pouring port to the bottom has a long dropping distance of the ink, air bubbles are likely to be generated.

With the above configuration, the ink jet recording apparatus of the present embodiment can suppress overflowing of the ink composition from the ink accommodating container due to foaming of the ink composition.

As the ink jet recording apparatus of the present embodiment, there is no limitation in a form unless otherwise specified.

For example, in the ink accommodating containers (for example, CISS tanks) for respective colors, the height from the ink pouring port to the bottom may differ depending on a design or layout of the ink accommodating container. For example, the ink accommodating container may have a high height from the ink pouring port to the bottom. For example, when the ink accommodating containers are stacked in two stages in order to make a length of a printer in a horizontal direction compact, an ink accommodating container having a height of two normal ink accommodating containers may be provided.

Alternatively, when an ink accommodating container having a large capacity is used, a width of the ink accommodating container in a horizontal direction may be increased. From the viewpoint of the layout, when it is not desired to increase the width of the ink accommodating container in the horizontal direction, the height of the ink accommodating container may be increased. In this case, in the CISS tanks for respective colors, the height from the pouring port to the bottom of the tank may be different.

In addition, in the CISS tanks for respective colors, a free layout may be used such that the capacity is the same and the height is different.

1.1. Ink Accommodating Container

In the ink jet recording apparatus of the present embodiment, the ink accommodating container has an ink pouring port. The ink accommodating container includes a first ink accommodating container and a second ink accommodating container having a lower height from a bottom of the accommodating container to the ink pouring port than the first ink accommodating container. The ink accommodating container is also simply referred to as an accommodating container.

The height from the bottom of the accommodating container to the ink pouring port means a height including not only a height of a main body of the accommodating container but also a portion of the ink pouring port. For example, when the ink accommodating containers are installed in two upper and lower stages from the viewpoint of preventing the width of the accommodating container from increasing in the horizontal direction, the ink pouring port of the lower ink accommodating container may be extended to the upper ink accommodating container, and positions of the ink pouring ports may be set to the same height between the ink accommodating containers in two upper and lower stages. In this case, the height from the bottom of the accommodating container to the ink pouring port of the lower ink accommodating container is higher than the height from the bottom of the accommodating container to the ink pouring port of the upper ink accommodating container, so that the upper ink accommodating container corresponds to the second ink accommodating container, and the lower ink accommodating container corresponds to the first ink accommodating container.

The first ink accommodating container and the second ink accommodating container may have different positions of the ink pouring port in the accommodating container. For example, the first ink accommodating container and the second ink accommodating container may have different positions of a coupling portion between an ink pouring pipe having the ink pouring port and the main body of the accommodating container, and may have different heights of the ink pouring port.

The different positions of the ink pouring ports tend to suppress the adhesion and mixing of the ink between the adjacent ink accommodating containers.

The first ink accommodating container and the second ink accommodating container may have the same or different heights of the ink pouring ports in the ink jet recording apparatus (positions of the ink pouring ports in a vertical direction), but it is preferable that the heights are the same.

When the heights of the ink pouring ports are the same, there is a tendency that the position of the ink pouring port is easily confirmed, and an ink is easily poured into each ink accommodating container.

From the viewpoint of suppressing foaming, in the first ink accommodating container and the second ink accommodating container, the height from the bottom of the accommodating container to the ink pouring port is preferably 400 mm or less. Furthermore, the height is preferably 300 mm or less, more preferably 250 mm or less, and still more preferably 200 mm or less. Furthermore, the height is particularly preferably 150 mm or less.

From the viewpoint of an ink accommodating amount, in the first ink accommodating container and the second ink accommodating container, the height from the bottom of the accommodating container to the ink pouring port is preferably 10 mm or more, more preferably 50 mm or more, still more preferably 70 mm or more, still more preferably 90 mm or more, and particularly preferably 100 mm or more.

From the viewpoint of the foaming suppression and the ink accommodating amount, it is preferable that a difference between the height from the bottom of the accommodating container to the ink pouring port of the first ink accommodating container and the height from the bottom of the accommodating container to the ink pouring port of the second ink accommodating container is 10 mm to 300 mm, 20 mm to 200 mm, 30 mm to 180 mm, 50 mm to 150 mm, or 75 mm to 125 mm.

It is preferable that a volume of each of the first ink accommodating container and the second ink accommodating container is 10 cm$^3$ to 500 cm$^3$, 40 cm$^3$ to 400 cm$^3$, or 80 cm$^3$ to 300 cm$^3$.

Furthermore, the volume of the first ink accommodating container is preferably 40 cm$^3$ to 500 cm$^3$, more preferably 80 cm$^3$ to 300 cm$^3$, still more preferably 100 cm$^3$ to 250 cm$^3$, and particularly preferably 130 cm$^3$ to 200 cm$^3$. The volume of the second ink accommodating container is preferably 10 cm$^3$ to 400 cm$^3$, more preferably 40 cm$^3$ to 200 cm$^3$, still more preferably 60 cm$^3$ to 150 cm$^3$, and particularly preferably 70 cm$^3$ to 120 cm$^3$.

The height from the bottom of the ink accommodating container to the ink pouring port is independent for each of the first ink accommodating container and the second ink accommodating container. The volume may also be independent for each of the first ink accommodating container and the second ink accommodating container.

It is preferable that a difference between the volume of the first ink accommodating container and the volume of the second ink accommodating container is 30 cm$^3$ to 180 cm$^3$, 50 cm$^3$ to 150 cm$^3$, or 60 cm$^3$ to 125 cm$^3$. Furthermore, the difference is preferably 60 cm$^3$ to 100 cm$^3$. It is preferable that the first ink accommodating container has a larger volume than the second ink accommodating container.

The volume of the ink accommodating container does not include a volume of an ink supply pipe described below.

Specifically, the ink accommodating container may be in the following aspects.

The ink accommodating container supplies the ink composition to the ink jet head. The ink accommodating container may have an ink pouring port provided at an upper portion and a liquid accommodating portion communicating with the ink pouring port and outside air. A user can insert a replenishment port of an ink bottle into the ink pouring port of the ink accommodating container and pour an ink accommodated in the ink bottle into the ink accommodating container. That is, the ink accommodating container is preferably a so-called continuous supply type ink accommodating container that is replenished with the ink from the outside without replacing the ink accommodating container even when the ink in the ink accommodating container is used up. The problem of foaming of the ink composition occurs not infrequently, particularly when an additional ink is poured. Therefore, the ink jet recording apparatus of the present embodiment preferably includes a continuous supply type ink accommodating container into which an additional ink can be poured.

An ink jet printer including such a continuous supply type ink accommodating container into which an additional ink can be poured may be used in an office, SOHO, or the like to print letters or images on plain paper.

Figure 5:
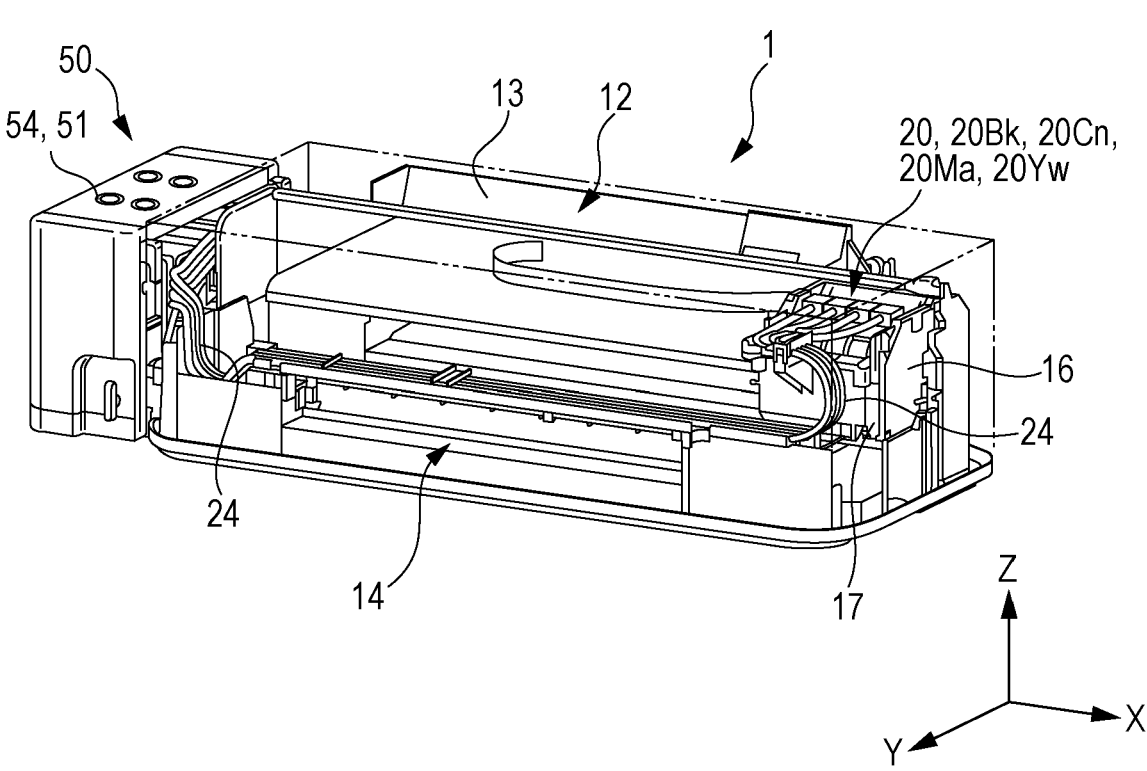
FIG. 5 is a schematic diagram of an example of an ink jet recording apparatus of the present embodiment.

FIG. 5 is a perspective diagram schematically illustrating an example of the ink jet recording apparatus of the present embodiment. An ink jet recording apparatus 1 includes an ink accommodating container 50 and an ink supply pipe 24 that supplies an ink from the ink accommodating container to an ink jet head 17. A sub tank 20 is provided at a relay point between the ink accommodating container 50 and the ink jet head 17, and the ink supplied via an ink supply pipe 24 is temporarily stored in the sub tank 20 and supplied to the ink jet head 17.

The ink jet head 17 discharges droplets of an ink composition (hereinafter, also simply referred to as an "ink") to record an image on a recording medium.

In addition, the ink jet recording apparatus 1 includes a carriage 16 on which the sub tank 20 and the ink jet head 17 are mounted and which is capable of reciprocating in an X axis direction, a paper feed port 12 for feeding the recording medium, a paper discharge port 14 for discharging the recording medium, and a support portion 13 that supports the recording medium to be fed to the paper feed port 12.

The ink jet head 17 has a nozzle surface (not illustrated) provided at a position facing a recording surface of the recording medium, and discharges the ink in a form of droplets from a plurality of nozzles (not illustrated) provided on the nozzle surface to adhere the ink to the recording surface of the recording medium.

As an ink jet recording method, for example, a method in which a strong electric field is applied between the nozzle and an acceleration electrode placed in front of the nozzle, an ink is continuously discharged from the nozzle in a form of droplets, and a print information signal is imparted to a polarization electrode while ink droplets fly between deflection electrodes, a method in which ink droplets are discharged in response to a printing information signal without deflecting the ink droplets (electrostatic suction method), a method in which ink droplets are forcibly discharged by adding a pressure to an ink liquid with a small pump and mechanically vibrating the nozzle with a crystal oscillator or the like, a method in which a pressure and a printing information signal are simultaneously added to an ink with a piezoelectric element to discharge or record ink droplets (piezo method), and a method in which an ink is heated and foamed using a microelectrode according to a printing information signal to discharge or record ink droplets (thermal jet method) can be used.

In FIG. 5, as an example, the sub tank 20 is provided with four sub tanks 20Bk, 20Cn, 20Ma, and 20Yw to correspond to inks of respective colors accommodated in the ink accommodating container 50. Note that there are also four ink jet heads 17 corresponding to colors of respective inks.

The carriage 16 is mounted with the ink jet head 17 and the sub tank 20, and reciprocates along an X axis by a carriage movement mechanism (not illustrated) including a motor, a timing belt, and the like. As the carriage 16 moves, the ink jet head 17 also reciprocates in the X axis direction. Therefore, the image is recorded on the recording medium in the X axis direction by discharging the ink from the ink jet head 17 in accordance with the movement of the carriage 16. In the present embodiment, a so-called serial head type ink jet recording apparatus is described as an example, but the present disclosure is not limited to this, and the ink container according to the present disclosure can also be applied to a so-called line head type ink jet recording apparatus.

The paper discharge port 14 is provided on a front surface of the ink jet recording apparatus 1. The paper feed port 12 is provided on a back surface side of the ink jet recording apparatus 1. When the recording medium is set in the paper feed port 12 to execute a recording operation, the recording medium is fed from the paper feed port 12, an image or the like is recorded inside, and then printing paper is discharged from the paper discharge port 14. The recording medium can be transported by a paper feed mechanism (not illustrated) for feeding the paper in a Y axis direction. As described above, the image can be recorded on the recording medium in the Y axis direction by discharging the ink from the ink jet head 17 in accordance with the movement of the recording medium by the paper feed mechanism.

The ink jet recording apparatus 1 includes a control section (not illustrated) that controls the entire operation of the ink jet recording apparatus 1, and the control section may include, for example, a CPU, a ROM, and a RAM. The control section controls operations such as an operation of reciprocating the carriage 16, an operation of feeding the recording medium, an operation of discharging the ink from the ink jet head 17, and an operation of supplying the ink from the ink accommodating container 50.

Although the entire ink accommodating container 50 is illustrated in FIG. 5, the ink accommodating container 50 has a plurality of ink accommodating containers divided for each ink inside, and has an ink supply pipe 24 and an ink pouring port 54 for each ink. The ink pouring port 54 is covered with a lid such as a cap (not illustrated) when the ink is not poured, the lid can be opened and closed, and the lid is opened to pour the ink when the ink is poured.

The ink accommodating container 50 may be formed of a plurality of ink accommodating containers formed by partitioning the inside with a wall, or a plurality of ink accommodating containers arranged side by side. In this manner, a plurality of ink accommodating containers are provided for respective inks.

A positional relationship between the plurality of ink accommodating containers is not limited, and for example, the plurality of ink accommodating containers may be arranged in the vertical direction (Z direction) or in the horizontal direction (X direction or Y direction). The aspect in which the ink accommodating containers are arranged in the vertical direction is preferable because an overall length of the ink accommodating containers in the horizontal direction is reduced, and a length of the ink jet recording apparatus in the horizontal direction is reduced, so that an installation area of the ink jet recording apparatus can be reduced.

A positional relationship between a plurality of the ink pouring ports 54 is not limited either, and the ink pouring ports 54 may be arranged in the vertical direction (Z direction) or in the horizontal direction (X direction or Y direction). It is preferable that the heights of the ink pouring ports 54 in the vertical direction are uniform because the position of the ink pouring port is easily confirmed when the ink is poured, and the ink is easily poured.

An embodiment of the ink accommodating container will be described with reference to FIG. 1.

FIG. 1 is a schematic diagram illustrating an embodiment of the ink accommodating container. FIG. 1 illustrates the inside of one example of the ink accommodating container in FIG. 5 in detail.

The ink accommodating container includes, for example, a first ink accommodating container 101 and a second ink accommodating container 102 having a lower height from a bottom of the accommodating container to an ink pouring port 103 than the first ink accommodating container 101. A first ink composition 105 is accommodated in the first ink accommodating container 101, and a second ink composition 106 is accommodated in the second ink accommodating container 102. The first ink composition 105 and the second ink composition 106 are poured from the ink pouring port 103. The first ink accommodating container 101 and the second ink accommodating container 102 are filled with the first ink composition 105 and the second ink composition 106 via an ink pouring pipe 104, respectively.

As illustrated in FIG. 1, the first ink accommodating container 101 and the second ink accommodating container 102 may be stacked in two upper and lower stages. In this case, the ink pouring pipe 104 of the lower accommodating container may be extended to the ink pouring port 103 of the ink pouring pipe 104 of the upper accommodating container, and the height (position in the vertical direction) of the ink pouring port in the ink jet recording apparatus may be set to be the same in the upper and lower accommodating containers.

In FIG. 1, the ink accommodating container has the ink pouring pipe 104, but the ink pouring pipe 104 need only be provided when adjusting the position of the ink pouring port 103 in the vertical direction, and the ink accommodating container need not have the ink pouring pipe 104. When the ink pouring pipe 104 is not provided, the ink accommodating container need only have the ink pouring port 103 without the ink pouring pipe 104.

For example, when the ink accommodating containers are arranged in the vertical direction, the ink accommodating container disposed below may have an ink pouring pipe, and the ink accommodating container disposed above may not have or may have an ink pouring pipe. In addition, the position of the ink pouring pipe in the ink accommodating container is not limited to that in the drawing.

The height from the bottom of the accommodating container to the ink pouring port is a height from the bottom inside the ink accommodating container to the ink pouring port. Although the phrase "height from the bottom of the accommodating container to the ink pouring port" is described, it actually refers to "height from the bottom of the ink accommodating container to the ink pouring port".

The ink pouring port is located at an upper end of the ink pouring pipe when the ink accommodating container has the ink pouring pipe, and the ink pouring port need only be provided, for example, at a position of a coupling portion between the ink pouring pipe and the ink accommodating container in FIG. 1 when the ink accommodating container does not have the ink pouring pipe.

As described above, a positional relationship between the first ink accommodating container 101 and the second ink accommodating container 102 is not limited to that in FIG. 1, and the first ink accommodating container 101 and the second ink accommodating container 102 may be arranged in the vertical direction or in the horizontal direction. In addition, a positional relationship between the ink pouring port of the first ink accommodating container 101 and the ink pouring port of the second ink accommodating container 102 is not limited to that in FIG. 1, and the ink pouring ports may be arranged in the vertical direction or in the horizontal direction.

A shape of each ink accommodating container is not limited to a hexahedron as illustrated in FIG. 1, and may be a polyhedron other than the hexahedron, a shape other than the polyhedron, or the like. A length of each ink accommodating container in the vertical direction and the horizontal direction (left-right direction and front-rear direction in the drawing) is not limited to that in FIG. 1. The ink accommodating container may be long in the vertical direction, long in the left-right direction, or long in the front-rear direction.

1.2. Ink Jet Head

The ink jet head discharges the ink composition supplied from the ink accommodating container.

The ink jet head may have a nozzle surface provided at a position facing the recording surface of the recording medium, and discharge the ink in a form of droplets from a plurality of nozzles provided on the nozzle surface to adhere the ink to the recording surface of the recording medium.

1.3. Ink Composition

The ink jet recording apparatus of the present embodiment includes an ink composition.

In addition, the ink composition includes a first ink composition accommodated in the first ink accommodating container and a second ink composition accommodated in the second ink accommodating container, and the first ink composition has a lower foaming property than the second ink composition.

The ink composition in the present embodiment may be designed to satisfy required characteristics based on a structure and properties of a recording device, an ink accommodating container, or the like.

Hereinafter, components that can be included in the ink composition (hereinafter, also simply referred to as an "ink") in the present embodiment will be described.

1.3.1. Colorant

The ink in the present embodiment may contain a colorant. Examples of the colorant include a pigment and a dye. The pigment is superior in water resistance, gas resistance, light resistance, and the like as compared with the dye.

As the pigment, a known pigment such as an inorganic pigment or an organic pigment can be used.

Examples of the inorganic pigment include, although not limited to the following, titanium oxide, iron oxide, calcium carbonate, barium sulfate, aluminum hydroxide, barium yellow, cadmium red, chrome yellow, carbon black, prussian blue, and metal powder.

Examples of the organic pigment include, although not limited to the following, an azo pigment, a polycyclic pigment, a nitro pigment, a nitroso pigment, and aniline black. Among these, an azo pigment and a polycyclic pigment are preferable.

Examples of the azo pigment include, although not limited to the following, azo lake, an insoluble azo pigment, a condensed azo pigment, and a chelated azo pigment.

Examples of the polycyclic pigment include, although not limited to the following, a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinophthalone pigment, an azomethine pigment, and a rhodamine B lake pigment.

A volume-based average particle diameter of the pigment (hereinafter, also simply referred to as an "average particle diameter of the pigment") is preferably 30 nm or more and 300 nm or less, and more preferably 50 nm or more and 200 nm or less.

When the average particle diameter of the pigment is within the above range, a color development property of the pigment may be improved, or clogging of a filter or a recording head may be reduced.

The average particle diameter of the pigment can be measured by using a particle size distribution measuring apparatus using a laser diffraction scattering method as the measurement principle. As the particle size distribution measuring apparatus, a particle size distribution meter (for example, "Microtrac UPA" manufactured by Nikkiso Co., Ltd.) using a dynamic light scattering method as the measurement principle can be used.

The pigment may be a surface-treated pigment or a pigment using a dispersant or the like, from the viewpoint of improving dispersibility in the ink.

The surface-treated pigment is a pigment that is made dispersible in an aqueous solvent with a hydrophilic group (carboxyl group, sulfonic acid group, phosphoric acid group, or the like) directly or indirectly bonded to a pigment surface through physical treatment or chemical treatment (hereinafter, also referred to as a "self-dispersion pigment").

In addition, the pigment using the dispersant is a pigment that is dispersed by a surfactant or a resin (hereinafter, the pigment dispersed by a resin is also referred to as a "resin dispersion pigment"), and it is possible to use a known substance as the surfactant or the resin.

In addition, the "resin dispersion pigment" also includes a pigment coated with a resin. The pigment coated with the resin can be obtained by an acid precipitation method, a phase inversion emulsification method, a mini-emulsion polymerization method, or the like. Since the content of the resin in the ink can be reduced, it is preferable to use a self-dispersing pigment.

As the self-dispersion pigment, a commercially available product may be used, and examples thereof include CAB-O-JET 400, 450C, 465M, 470Y (manufactured by Cabot Corporation).

From the viewpoint of suppressing the foaming, it is preferable that the first ink composition contains a self-dispersion pigment and the second ink composition contains a resin dispersion pigment.

A dye may be used as the colorant, and examples of the dye include known dyes. Examples thereof include a direct dye, an acid dye, and a disperse dye.

The content of the colorant is preferably 0.5% by mass to 20% by mass, more preferably 1% by mass to 10% by mass, and still more preferably 3% by mass to 7% by mass in terms of solid content with respect to the total mass (100% by mass) of the ink.

The first ink composition and the second ink composition are each independently preferably any one of black ink, cyan ink, yellow ink, or magenta ink, and it is preferable that the first ink composition is black ink and the second ink composition is any one of cyan ink, yellow ink, or magenta ink. The black ink is preferably accommodated in the first ink accommodating container because the black ink is more likely to foam than inks of other colors.

The black ink, the cyan ink, the yellow ink, and the magenta ink are inks containing colorants having color development properties of black, cyan, yellow, and magenta, respectively, as colorants.

1.3.2. Resin

The ink in the present embodiment may contain a resin such as resin particles or a pigment dispersant resin.

The resin particles have a function of improving adhesion of the ink adhering to the recording medium, and the pigment dispersant resin has a function of improving the dispersibility of the pigment described above.

As the resin, any type of resin can be used, such as a resin in a dissolved state or a particle state such as an emulsion. For example, when the resin is in a form of particles (hereinafter, also referred to as "resin particles"), a volume-based average particle diameter of the resin particles (hereinafter, also simply referred to as an "average particle diameter of the resin particles") is preferably 30 nm or more and 300 nm or less. The volume-based average particle diameter is more preferably 50 nm or more and 200 nm or less. When the average particle diameter of the resin particles is within the above range, there is a tendency that fixability of the ink to the recording medium is improved and clogging of a filter or a recording head is reduced.

The average particle diameter of the resin particles can be measured by using a particle size distribution measuring apparatus using a laser diffraction scattering method as the measurement principle. As the particle size distribution measuring apparatus, a particle size distribution meter (for example, "Microtrac UPA" manufactured by Nikkiso Co., Ltd.) using a dynamic light scattering method as the measurement principle can be used.

As the resin particles, for example, acrylic resin, fluorene resin, urethane resin, polyolefin resin, rosin-modified resin, terpene resin, polyester resin, polyamide resin, epoxy resin, vinyl chloride resin, vinyl chloride-vinyl acetate copolymer, and ethylene vinyl acetate resin can be used. These resin particles may be used alone or in combination of two or more.

The acrylic resin may be a styrene acrylic resin. As the resin particles, a commercially available product may be used, and examples thereof include X-436 (styrene acrylic resin emulsion manufactured by Seiko PMC Co., Ltd.).

Examples of the pigment dispersant resin include polyvinyl alcohols, polyacrylic acid, acrylic acid-acrylonitrile copolymer, vinyl acetate-acrylate ester copolymer, acrylic acid-acrylic acid ester copolymer, styrene-acrylic acid copolymer, styrene-methacrylic acid copolymer, styrene-methacrylic acid-acrylic acid ester copolymer, styrene-α-methyl styrene-acrylic acid copolymer, styrene-α-methyl styrene-acrylic acid-acrylic acid ester copolymer, styrene-maleic acid copolymer, styrene-maleic anhydride copolymer, vinyl naphthalene-acrylic acid copolymer, vinyl naphthalene-maleic acid copolymer, vinyl acetate-maleic acid ester copolymer, vinyl acetate-crotonic acid copolymer, and vinyl acetate-acrylic acid copolymer, and salts thereof.

Among these, an acrylic resin is preferable. The acrylic resin is a general term for a polymer obtained by polymerizing at least one component of an acrylic monomer such as acrylic acid, methacrylic acid, acrylic acid ester, and methacrylic acid ester. Examples thereof include a resin obtained from an acrylic monomer and a copolymer of an acrylic monomer and a monomer other than the acrylic monomer. Examples thereof include an acrylic-vinyl resin which is a copolymer of an acrylic monomer and a vinyl monomer, such as a copolymer with a vinyl monomer such as styrene. For example, a styrene acrylic resin can be exemplified.

Among these, a copolymer of a monomer having a hydrophobic functional group and a monomer having a hydrophilic functional group, and a polymer including a monomer having both a hydrophobic functional group and a hydrophilic functional group are preferable. As a form of the copolymer, any form of a random copolymer, a block copolymer, an alternating copolymer, and a graft copolymer can be used.

The content of the resin in terms of solid content is preferably less than 100 parts by mass, more preferably 0.5 parts by mass or more and 60 parts by mass or less, still more preferably 1.0 part by mass or more and 50 parts by mass or less, and particularly preferably 2.0 parts by mass or more and 40 parts by mass or less, with respect to 100 parts by mass of the pigment included in the ink.

Since the content of the resin is less than the content of the pigment, film formation of the resin adhering to the recording medium is less likely to be inhibited by the pigment, and thus the adhesion of the ink to the recording medium tends to be improved.

The total content of the resin and the pigment is preferably 20% by mass or less in terms of solid content, with respect to the total mass (100% by mass) of the ink. When the total amount is 20% by mass or less, generation of an aggregate in the ink can be reduced.

The total content of the resin and the pigment is more preferably 2% by mass or more and 15% by mass or less, still more preferably 3% by mass or more and 15% by mass or less, and still more preferably 3% by mass or more and 11% by mass or less.

From the viewpoint of suppressing the foaming, the total content of the resin particles and the pigment dispersant resin in the first ink composition and in the second ink composition is preferably 6.0% by mass or less, more preferably 5.0% by mass or less, and still more preferably 3.0% by mass or less, with respect to the total amount of the composition.

The total content of the resin particles and the pigment dispersant resin in the first ink composition is preferably 3.0% by mass or less, more preferably 2.0% by mass or less, and still more preferably 1.0% by mass or less, and may be 0% by mass, with respect to the total amount of the composition. In addition, the total content is preferably 0.1% by mass or more, more preferably 0.5% by mass or more, still more preferably 1.0% by mass or more, and particularly preferably 2.0% by mass or more.

It is preferable that a difference between the total content of the resin particles and the pigment dispersant resin in the first ink composition and the total content of the resin particles and the pigment dispersant resin in the second ink composition is 0.1% by mass to 6.0% by mass, 0.2% by mass to 5.0% by mass, or 0.5% by mass to 3.0% by mass.

From the viewpoint of suppressing the foaming, the first ink composition preferably has a lower total content of the resin particles and the pigment dispersant resin than the second ink composition.

1.3.3. Organic Solvent

The ink in the present embodiment may contain an organic solvent.

Examples of the organic solvent include alkanediols, polyhydric alcohols, glycol ethers, nitrogen-containing heterocyclic compounds, urea, and urea derivatives. One type of these materials may be used alone, or a mixture of two or more types may be used.

Examples of the alkanediols include 1,2-alkanediols having 4 to 8 carbon atoms (for example, 1,2-butanediol, 1,2-pentanediol, 1,2-hexanediol, and 1,2-octanediol), 2-methyl-1,3-propanediol, 2,2-dimethyl-1,3-propanediol, and 2-ethyl-1,3-hexanediol.

The alkanediols have a function of improving the wettability with respect to the recording medium and suppressing drying and solidification of the ink on the nozzle surface of the recording head.

When the alkanediols are contained, the content thereof may be, for example, 0.1% by mass or more and 20% by mass or less with respect to the total mass of the ink. In order to prevent the wettability from being excessively improved, the content is preferably 0.5% by mass or more and 5% by mass or less or 0.5% by mass or more and 3% by mass or less.

Among the above alkanediols, 1,2-alkanediols having 5 or 6 carbon atoms are preferably used. This is because these compounds have a low decrease in surface tension of the ink despite the improvement in permeability and wettability of the ink with respect to the recording medium.

Examples of the glycol ethers include alkylene glycol monoether and alkylene glycol diether.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

One type of the glycol ethers can be used alone, or a mixture of two or more types can be used. The glycol ethers can be preferably used because the surface tension of the ink is less likely to decrease despite the improvement in permeability and wettability of the ink with respect to the recording medium.

When the glycol ethers are contained, the content thereof may be, for example, 0.05% by mass or more and 6% by mass or less with respect to the total mass of the ink. Furthermore, in order to appropriately control the wettability in consideration of the precipitation of the aggregate or the like, the content is preferably 0.2% by mass or more and 4% by mass or less.

Examples of the polyhydric alcohols (excluding the above-described alkanediols) include ethylene glycol, propylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 2-methyl-2,4-pentanediol, 3-methyl-1,5-pentanediol, diethylene glycol, triethylene glycol, tetraethylene glycol, dipropylene glycol, trimethylolpropane, and glycerin. The polyhydric alcohols can be preferably used from the viewpoint of suppressing the drying and solidification of the ink on the nozzle surface of the head to reduce clogging, discharge failure, and the like. When the polyhydric alcohols are contained, the content thereof may be, for example, 5% by mass or more and further 5% by mass or more and 30% by mass or less with respect to the total mass of the ink.

Examples of the nitrogen-containing heterocyclic compounds include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and hydantoin. Examples of the urea or urea derivatives include urea, ethylene urea, tetramethyl urea, and thiourea. One type of these can be used alone, or a mixture of two or more types can be used. These can be preferably used from the viewpoint of suppressing the drying and solidification of the ink on the nozzle surface of the head to reduce clogging, discharge failure, and the like, as with the polyhydric alcohols. When these are contained, the content thereof may be, for example, 0.5% by mass or more and 10% by mass or less, and preferably 1% by mass or more and 5% by mass or less, with respect to the total mass of the ink.

Polyhydric alcohols, nitrogen-containing heterocyclic compounds, urea, and urea derivatives function as moisturizers. Among the above, glycerin and one or more selected from the group consisting of polyhydric alcohols (excluding glycerin from the above-mentioned polyhydric alcohols), nitrogen-containing heterocyclic compounds, urea, and urea derivatives are used in combination, whereby both long-term moisture evaporation and rapid moisture evaporation occurring on a wall surface of an ink chamber can be effectively suppressed. In this case, more preferable polyhydric alcohols include propylene glycol, dipropylene glycol, 1,3-butanediol, diethylene glycol, triethylene glycol, and trimethylolpropane. Among the polyhydric alcohols, propylene glycol, dipropylene glycol, diethylene glycol, and 1,3-butanediol are preferable, from the viewpoint of preventing precipitates. In addition, as the nitrogen-containing heterocyclic compounds, a pyrrolidone derivative and hydantoin are preferable, and 2-pyrrolidone and hydantoin are more preferable. Furthermore, as the urea derivatives, ethylene urea, tetramethyl urea, and thio urea are preferable.

When the ink in the present embodiment contains any one or more selected from 1,2-alkanediol having 4 to 8 carbon atoms, 2-methyl-1,3-propanediol, 2,2-dimethyl-1,3-propanediol, 2-ethyl-1,3-hexanediol, and glycol ether, it is desirable to add a moisturizer in which glycerin and one or more selected from the group consisting of other polyhydric alcohols (excluding glycerin from the above-mentioned polyhydric alcohols), nitrogen-containing heterocyclic compounds, urea, and urea derivatives are used in combination, from the viewpoint of preventing precipitation of the aggregate.

The total content of the organic solvent is preferably 0.1% by mass to 30% by mass, more preferably 1.0% by mass to 25% by mass, and still more preferably 5% by mass to 20% by mass, with respect to the total mass of the ink composition.

1.3.4. Water

The ink in the present embodiment may contain water. The ink in the present embodiment is preferably an aqueous ink in which water is a main solvent of the ink and water is a component that evaporates and scatters by drying. The content of water in the water-based ink is preferably 40% by mass or more, and more preferably 50% by mass or more, with respect to the total mass of the ink. In addition, the content is preferably 60% by mass to 99% by mass.

Examples of water include pure water such as ion exchange water, ultra-filtered water, reverse osmosis water, and distilled water; and ultrapure water, from which ionic impurities were removed as much as possible. In addition, when water sterilized by ultraviolet irradiation or addition of hydrogen peroxide is used, it is possible to prevent the growth of mold and bacteria when the ink is stored for a long period of time.

1.3.5 Surfactant

The ink in the present embodiment may contain a surfactant. The surfactant has a function of lowering the surface tension and improving the wettability with the recording medium. Among the surfactants, for example, an acetylene glycol surfactant, a silicone surfactant, a fluorine surfactant, and a polyoxyethylene alkyl ether surfactant can be preferably used.

The acetylene glycol surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA (hereinabove, all product names, manufactured by Air Products and Chemicals. Inc.), OLFINE B, Y, P, A, STG, SPC, E1004, E1010, PD-001, PD-002W, PD-003, PD-004, EXP. 4001, EXP. 4036, EXP. 4051, EXP. 4300, AF-103, AF-104, AK-02, SK-14, AE-3 (hereinabove, all product names, manufactured by Nissin Chemical Industry Co., Ltd.), and Acetylenol E00, E00P, E40, E100 (hereinabove, all product names, manufactured by Kawaken Fine Chemicals Co., Ltd.).

The silicone surfactant is not particularly limited, a polysiloxane compound is preferable. The polysiloxane compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (hereinabove, product names, manufactured by BYK Chemie Japan Co., Ltd.), and KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (hereinabove, product names, manufactured by Shin-Etsu Chemical Co., Ltd.).

As the fluorine surfactant, a fluorine-modified polymer is preferably used, and specific examples thereof include MEGAFACE series (manufactured by DIC Corporation), ZONYL series (manufactured by DuPont), and BYK-340 (manufactured by BYK Chemie Japan Co., Ltd.).

The polyoxyethylene alkyl ether surfactant is not particularly limited and can be appropriately selected according to the purpose, and is preferably selected from compounds represented by a general formula $C_nH_{n+1}O(C_mH_{2m}O)_lH$ (where, in the general formula, n represents an integer of 5 or more, and m and l represent integers of 1 or more). Specific examples thereof $C_8H_{17}O(C_2H_4O)_2H$, $C_{10}H_{21}O(C_2H_4O)_4H$, $C_{12}H_{25}O(C_2H_4O)_3H$, $C_{12}H_{25}O(C_2H_4O)_7H$, $C_{12}H_{25}O(C_2H_4O)_{12}H$, $C_{13}H_{27}O(C_2H_4O)_3H$, $C_{13}H_{27}O$ $(C_2H_4O)_5H$, $C_{13}H_{27}O(C_2H_4O)_7H$, $C_{13}H_{27}O(C_2H_4O)_9H$, $C_{13}H_{27}O(C_2H_4O)_{12}H$, $C_{13}H_{27}O(C_2H_4O)_{20}H$, $C_{13}H_{27}O$ $(C_2H_4O)_{30}H$, and $C_{14}H_{29}O(C_2H_4O)_{30}H$. One type of these may be used alone, or two or more types may be used in combination, but in the latter case, it is effective when one type alone is difficult to be dissolved in the ink, and is advantageous in that the solubility in the ink can be improved. As the polyoxyethylene alkyl ether surfactant, a commercially available product may be used, and examples of the commercially available product include BT series (manufactured by Nikko Chemicals Co., Ltd.), SOFTANOL series (manufactured by Nippon Shokubai Co., Ltd.), and DISPANOL (manufactured by Nihon Oils & Fats Co., Ltd.).

Among the above-mentioned surfactants, in consideration of the wettability and force of lowering the surface tension, a silicone surfactant, an acetylene glycol surfactant, or a polyoxyethylene alkyl ether surfactant is preferable, and an acetylene glycol surfactant or a polyoxyethylene alkyl ether surfactant is more preferable.

1.3.6. Others

The ink in the present embodiment may contain, for the purpose of improving the performance thereof, wax particles (for example, polyolefin wax or paraffin wax), amphoteric ion compounds (for example, betaine compounds and amino acids and derivatives thereof), saccharides (for example, glucose, mannose, fructose, ribose, xylose, arabinose, galactose, aldonic acid, sorbitol, maltose, cellobiose, lactose, sucrose, trehalose, maltotriose, and reduced starch saccharides), sugar alcohols, hyaluronic acids, ureas, preservatives and antifungal agents (for example, sodium benzoate, sodium pentachlorophenol, sodium 2-pyridinethiol-1-oxide, sodium sorbate, sodium dehydroacetate, and 1,2-dibenzi-nethiazolin-3-one), pH adjusting agents (for example, potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium bicarbonate), chelating agents (for example, ethylenediaminetetraacetic acid and salts thereof (disodium ethylenediaminetetraacetic acid, and the like)), and defoaming agents (SN Wet 980 (manufactured by San Nopco Co., Ltd.).

1.3.7. Foaming Property

The ink composition includes a first ink composition accommodated in the first ink accommodating container and a second ink composition accommodated in the second ink accommodating container, and the first ink composition has a lower foaming property than the second ink composition.

The foaming property of the ink composition was measured as a height of a foam produced when 200 mL of an ink is dropped from a height of 900 mm at a room temperature of 25° C. onto a liquid surface for 30 seconds, in accordance with JIS K 3362-2008.

The first ink composition and the second ink composition each independently have a foaming property of preferably 60 mm or less, more preferably 30 mm or less, as measured in accordance with JIS K 3362-2008. Furthermore, the foaming property is still more preferably 10 mm or less.

The first ink composition and the second ink composition may each independently have a foaming property of 0 mm or more, as measured in accordance with JIS K 3362-2008. The foaming property is preferably 10 mm or more, and more preferably 30 mm or more.

A case in which the foaming property is equal to or less than the above range is preferable because the foaming of the ink can be reduced, and a case in which the foaming property is equal to or more than the above range is preferable because a degree of freedom in designing the ink is high and scratch resistance of the ink and the like can be improved.

The foaming property of the ink can be made different by changing the ink composition. For example, the foaming property can be adjusted by the total content of the resin particles and the pigment dispersant resin of the ink. Alternatively, when there are two inks, the foaming properties of the inks are measured by the above method, and the inks need only be allocated such that the ink having a small foaming property is accommodated in the first ink accommodating container and the ink having a large foaming property is accommodated in the second ink accommodating container.

It is preferable that a difference between the foaming property of the first ink composition measured in accordance with JIS K 3362-2008 and the foaming property of the second ink composition measured in accordance with JIS K 3362-2008 is 1 mm to 60 mm, 5 mm to 40 mm, 10 mm to 35 mm, 15 mm to 30 mm, or 20 mm to 25 mm.

2. Recording Method

A recording method of the present embodiment is a recording method using the ink jet recording apparatus of the present embodiment, the method including a step of supplying the first ink composition accommodated in the first ink accommodating container and the second ink composition accommodated in the second ink accommodating container to the ink jet head and a step of discharging the first ink composition and the second ink composition from the ink jet head and adhering the first ink composition and the second ink composition to a recording medium.

The recording method of the present embodiment includes a step of supplying the first ink composition accommodated in the first ink accommodating container and the second ink composition accommodated in the second ink accommodating container to the ink jet head.

The ink jet recording apparatus of the present embodiment includes an ink accommodating container for supplying the ink composition to the ink jet head.

There is no particular limitation on the aspect of supplying the ink composition from the accommodating container to the ink jet head.

For example, the ink jet head and the ink accommodating container may communicate with each other via a communication portion, and the ink composition may be supplied from the ink accommodating container to the ink jet head via the communication portion.

Specifically, the following aspect may be adopted.

One end of a liquid supply tube is coupled to the ink accommodating container, and the other end is coupled to the ink jet head. The ink accommodated in the ink accommodating container is supplied to the ink jet head via the liquid supply tube.

The recording method of the present embodiment includes a step of discharging the first ink composition and the second ink composition from the ink jet head and adhering the first ink composition and the second ink composition to a recording medium.

The ink jet method is not particularly limited, and examples thereof include a charge deflection method, a continuous method, and an on-demand method (a piezoelectric method or a Bubble Jet (registered trademark) method).

In addition, the recording method may include a step of pouring an ink into the ink accommodating container. The step is a step of opening a lid of an ink pouring port of the ink accommodating container, pouring the ink from the ink pouring port into the ink accommodating container, and replenishing the ink accommodating container with the ink. For example, the ink contained in an ink bottle or the like need only be poured from the ink bottle into the ink pouring port.

2.1. Recording Medium

The constituent material of the recording medium is not particularly limited, and examples thereof include resin materials such as polyurethane, polyethylene, polypropylene, polyester, polyamide, and acrylic resin, paper, glass, metal, ceramics, leather, wood, china, and fabric.

Examples of the constituent material of the recording medium include fibers made of at least one of the above, and various natural fibers, synthetic fibers, and semisynthetic fibers formed from silk, wool, cotton, hemp, polyester, polyamide (nylon), acrylic, polyurethane, cellulose, linter, rayon, cupra, and acetate. As the recording medium, one or two or more selected from the above-mentioned constituent materials can be used in combination. In addition, as the recording medium, a material having a three-dimensional shape such as a sheet shape, a spherical shape, or a rectangular parallelepiped shape may be used.

Examples of the recording medium include an absorptive recording medium having an ink-absorbing property, a low-absorptive recording medium having a low ink-absorbing property, and a non-absorptive recording medium that does not absorb an ink.

Examples of an absorptive recording medium include a recording medium whose surface is provided with an ink-absorbing ink-receiving layer and a recording medium whose base material itself has an ink-absorbing property. Examples thereof include fabric, plain paper, and ink jet paper.

Examples of a low-absorptive recording medium include coated paper provided with a coating layer having a low ink-absorbing property.

A non-absorptive recording medium is made of an ink-non-absorbing material such as glass, metal, or plastic, and examples thereof include a recording medium whose surface is not provided with an ink-absorbing ink-receiving layer and a recording medium whose surface is provided with an ink-non-absorbing layer.

EXAMPLES

Hereinafter, the present disclosure will be described in more detail with reference to Examples and Comparative Examples. The present disclosure is not limited by following Examples.

Material of Ink Composition

Main materials of ink compositions used in following Examples and Comparative Examples are as follows.

Self-Dispersion Pigment

CAB-O-JET 400 (black pigment)

CAB-O-JET 450C (cyan pigment)

CAB-O-JET 465M (magenta pigment)

CAB-O-JET 470Y (yellow pigment)

Resin Dispersion Pigment

A resin dispersion pigment is obtained by the following production method.

20 parts by mass of an organic solvent (methyl ethyl ketone), 0.03 parts by mass of a polymerization chain transfer agent (2-mercaptoethanol), 15 parts by mass of polypropylene glycol monomethacrylate (propylene oxide group=9), 15 parts by mass of poly(ethylene glycol/propylene glycol) monomethacrylate (propylene oxide group=7, ethylene oxide group=5), 12 parts by mass of methacrylic acid, 50 parts by mass of styrene monomer, 10 parts by mass of styrene macromer, and 10 parts by mass of benzyl methacrylate were used. These were placed in a reaction container in which nitrogen gas substitution was sufficiently performed, and polymerized under stirring at 75° C. by adding 0.9 parts by mass of 2,2'-azobis(2,4-dimethylvaleronitrile), which is a polymerization initiator dissolved in 40 parts by mass of methyl ethyl ketone, to 100 parts by mass of a monomer component. The mixture was aged at 80° C. for 1 hour, thereby obtaining a polymer solution containing a pigment dispersant resin.

The dispersion resin obtained above was dissolved in 45 parts by mass of methyl ethyl ketone, and a predetermined amount of a 20% aqueous sodium hydroxide solution (neutralizing agent) was added thereto to neutralize salt-forming groups. Further, P.B. 15:3 (manufactured by Toyocolor Co., Ltd.) was added as a pigment and kneaded for 2 hours in a bead mill. A mass ratio of the dispersion resin to the pigment is as illustrated in FIG. 2.

After 120 parts by mass of ion-exchanged water was added to the obtained kneaded product and stirred, the methyl ethyl ketone was removed at 6° C. under reduced pressure, and a part of the water was further removed to obtain a resin-coated pigment dispersion liquid having a solid content concentration of 20% by mass.

Dye

Cyan dye (acid blue 7)

Organic Solvent

Glycerin

Triethylene glycol

Triethylene glycol monobutyl ether

Triethylene glycol monomethyl ether

2-Pyrrolidone 1,2-Hexanediol

Resin

X-436 (styrene acrylic resin emulsion manufactured by Seiko PMC Co., Ltd.)

Surfactant

OLFINE E1010 (acetylene glycol surfactant manufactured by Nissin Chemical Industry Co., Ltd.)

OLFINE EXP4300 (acetylene glycol surfactant manufactured by Nissin Chemical Industry Co., Ltd.)

pH Adjusting Agent

Triethanolamine

Defoaming Agent

SN Wet 980 (manufactured by Sanyo Chemical Industries, Ltd.)

Preparation of Ink Composition

Each material was mixed with a composition shown in FIG. 2 and sufficiently stirred to obtain each ink composition. In FIG. 2, a unit of numerical value is "% by mass", and a total of numerical values is 100.0% by mass.

The following evaluations were performed for each ink composition.

Evaluation

Foaming Property

In accordance with JIS K 3362-2008, a height of a foam produced when 200 mL of an ink is dropped from a height of 900 mm at a room temperature of 25° C. onto a liquid surface for 30 seconds was measured as a foaming property. The measurement was performed five times, and the foaming property was calculated as an average value. The obtained foaming property was evaluated according to the following evaluation criteria.

Evaluation Criteria a: The foaming property was 0 mm or more and 10 mm or less.

b: The foaming property was 10 mm or more and 30 mm or less.

c: The foaming property was more than 30 mm and 60 mm or less.

d: The foaming property was more than 60 mm.

Scratch Resistance

A modified machine described below was filled with each ink composition, and a 2×2 cm square, monochrome 100% Duty pattern 101 was printed on the center of A4-sized photo paper 100 (EPSON photo paper <glossy> KA4100PSKR).

The scratch resistance when the printed portion was rubbed with a finger at a force of 0.5 N and a speed of 10 cm/sec was evaluated according to the following evaluation criteria.

Evaluation Criteria a: It was visually confirmed that the printed portion was not scraped when the printed portion was rubbed with a finger at a point in time 15 minutes after printing.

b: It was visually confirmed that the printed portion was scraped when the printed portion was rubbed with a finger at a point in time 15 minutes after printing, but the printed portion was not scraped when the printed portion was rubbed with a finger at a point in time 6 hours after printing. c: It was visually confirmed that the printed portion was scraped when the printed portion was rubbed with a finger at a point in time 6 hours after printing, but the printed portion was not scraped when the printed portion was rubbed with a finger at a point in time 24 hours after printing.

Examples 1 to 10 and Comparative Examples 1 and 2

An ink jet printer PX-M791FT (manufactured by Seiko Epson Corporation) was modified to obtain a modified PX-M791FT.

A length from the bottom of the ink accommodating container to the ink pouring port was set as illustrated in FIGS. 3 and 4, and the ink accommodating container was set as will be described below. Specifically, an ink pouring pipe (cylindrical shape having a diameter of 1 cm) was attached to the center of an upper surface of the ink accommodating container, and an upper end of the ink pouring pipe was used as the ink pouring port. A height of the ink pouring pipe was changed, and a height from the ink pouring port to the bottom of the tank was set as illustrated in FIGS. 3 and 4.

The modified PX-M791FT includes a first ink accommodating container and a second ink accommodating container, and heights in the vertical direction of ink pouring ports of the first ink accommodating container and the second ink accommodating container in the ink jet recording apparatus were made the same as those in FIG. 1, and the heights of the ink pouring ports were aligned to facilitate ink pouring.

The volume of the first ink accommodating container was 160 cm$^3$, and the volume of the second ink accommodating container was 95 cm$^3$.

The interior of the first ink accommodating container (a portion excluding the ink pouring pipe) was 5 cm in height, 5 cm in width, and 6.4 cm in depth. The interior of the second ink accommodating container (a portion excluding the ink pouring pipe) was 5 cm in height, 5 cm in width, and 3.8 cm in depth.

As illustrated in FIGS. 3 to 4, the modified PX-M791FT was filled with each ink composition, and the following evaluation was performed.

Evaluation

Tank Height

For the modified PX-M791FT, a length [mm] from the bottom of the ink accommodating container to the ink pouring port was measured.

Foam Height 70 g of an ink was poured into each of the ink accommodating containers of the modified PX-M791FT from an ink-free state, and a height from an ink liquid surface immediately after the completion of pouring to the highest position of a foam was evaluated according to the following evaluation criteria and the following determination criteria.

Evaluation Criteria

A: The highest position of the ink foam was lower than the position of the ink pouring port by 3 cm or more.

B: The highest position of the ink foam was lower than the position of the ink pouring port by less than 3 cm and 1 cm or more.

C: The highest position of the ink foam was higher than a position lower than the position of the ink pouring port by 1 cm.

The evaluation of the foam height in the first ink accommodating container and the second ink accommodating container in the modified PX-M791FT was determined according to the following determination criteria.

Determination Criteria

A: Both the first ink accommodating container and the second ink accommodating container were evaluated as A.

B: At least one of the first ink accommodating container and the second ink accommodating container was evaluated as B, and there was no C evaluation.

C: At least one of the first ink accommodating container and the second ink accommodating container was evaluated as C.

As illustrated in FIGS. 2 to 4, in Examples using the ink jet recording apparatus of the present embodiment, the foam height was A or B. Therefore, it was possible to suppress overflowing of the ink composition from the ink accommodating container.

On the other hand, in Comparative Examples, in the ink accommodating containers, a first ink accommodated in the first ink accommodating container having a high height from the bottom of the accommodating container to the ink pouring port was not an ink having a lower foaming property than a second ink accommodated in the second ink accommodating container having a low height from the bottom of the accommodating container to the ink pouring port, and the foam height was C. Therefore, it was not possible to suppress overflowing of the ink composition from the ink accommodating container.

What is claimed is:

1. An ink jet recording apparatus comprising:

an ink accommodating container having an ink pouring port;

an ink composition; and an ink jet head that discharges the ink composition supplied from the ink accommodating container, wherein the ink accommodating container includes a first ink accommodating container and a second ink accommodating container having a lower height from a bottom of the accommodating container to the ink pouring port than the first ink accommodating container, the ink composition includes a first ink composition accommodated in the first ink accommodating container and a second ink composition accommodated in the second ink accommodating container, the first ink composition has a lower foaming property than the second ink composition, the first ink accommodating container and the second ink accommodating container have the same height of the ink pouring port in the ink jet recording apparatus, and the first ink accommodating container and the second ink accommodating container have overlapping portions when viewed from a vertical direction.

2. The ink jet recording apparatus according to claim 1, wherein the first ink composition and the second ink composition have a foaming property of 60 mm or less, as measured in accordance with JIS K 3362-2008.

3. The ink jet recording apparatus according to claim 1, wherein in the first ink accommodating container and the second ink accommodating container, a height from a bottom of the accommodating container to the ink pouring port is 300 mm or less.

4. The ink jet recording apparatus according to claim 1, wherein in the first ink composition and in the second ink composition, a total content of resin particles and a pigment dispersant resin is 6.0% by mass or less with respect to a total amount of the composition.

5. The ink jet recording apparatus according to claim 1, wherein the first ink composition has a smaller total content of resin particles and a pigment dispersant resin than the second ink composition.

6. The ink jet recording apparatus according to claim 1, wherein the first ink accommodating container has a larger volume than the second ink accommodating container.

7. The ink jet recording apparatus according to claim 1, wherein the first ink composition and the second ink composition are each independently any one of a black ink, a cyan ink, a yellow ink, or a magenta ink.

8. The ink jet recording apparatus according to claim 1, wherein the first ink composition contains a self-dispersion pigment, and the second ink composition contains a resin dispersion pigment.

9. A recording method using the ink jet recording apparatus according to claim 1, the method comprising:

supplying the first ink composition accommodated in the first ink accommodating container and the second ink composition accommodated in the second ink accommodating container to the ink jet head; and discharging the first ink composition and the second ink composition from the ink jet head and adhering the first ink composition and the second ink composition to a recording medium.

* * * * *